United States Patent
Kotwicki et al.

(12) 
(10) Patent No.: US 6,308,694 B1
(45) Date of Patent: *Oct. 30, 2001

(54) FLOW MEASUREMENT AND CONTROL

(75) Inventors: Allan Joseph Kotwicki, Williamsburg; John David Russell, Farmington Hills, both of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 244 days.

(21) Appl. No.: 09/226,681

(22) Filed: Jan. 11, 1999

(51) Int. Cl.$^7$ ............................. F02M 25/07; G01F 1/42
(52) U.S. Cl. .................................. 123/568.16; 73/861.61
(58) Field of Search ......................... 123/568.11, 568.16, 123/568.21, 568.23, 568.24, 568.25, 568.26, 568.27, 568.28; 73/117.3, 118.2, 861.52, 861.61

(56) References Cited

U.S. PATENT DOCUMENTS

| 4,290,404 | | 9/1981 | Hata et al. ........................... 123/478 |
| 4,390,001 | | 6/1983 | Fujimoto ......................... 123/568.27 |
| 4,406,161 | | 9/1983 | Locke et al. ........................ 73/118.1 |
| 4,562,744 | * | 1/1986 | Hall et al. ......................... 73/861.61 |
| 4,690,120 | * | 9/1987 | Egle ................................ 123/568.16 |
| 5,086,655 | * | 2/1992 | Fredericks et al. ............... 73/861.61 |
| 5,188,086 | * | 2/1993 | Adkins et al. ................... 123/568.27 |
| 5,190,017 | * | 3/1993 | Cullen et al. ................... 123/568.16 |
| 5,203,313 | * | 4/1993 | Rotarius ......................... 123/568.27 |
| 5,347,843 | * | 9/1994 | Orr et al. ......................... 73/861.52 |
| 5,461,932 | * | 10/1995 | Hall et al. ....................... 73/861.61 |
| 5,613,479 | * | 3/1997 | Gates et al. .................... 123/568.27 |
| 5,988,149 | * | 11/1999 | Gates ............................. 123/568.21 |

OTHER PUBLICATIONS

Experimental Methods for Engineers, Second Edition, "Flow Measurement", J.P. Holman, pp. 185–236, McGraw–Hill Book Co., no date.

The Internal–Combustion Engine in Theory and practice, Vol. I: Thermodynamics, Fluid flow, Performance, Second Ed., Revised, "Appendix three—Flow of Fluids", C. F. Taylor, p. 503, MIT Press, no date.

* cited by examiner

*Primary Examiner*—John D. Russell
(74) *Attorney, Agent, or Firm*—John D. Russell

(57) ABSTRACT

An exhaust gas recirculation systems directs exhaust gasses from an exhaust manifold to an intake manifold of an internal combustion engine. The exhaust gasses travel from the exhaust manifold, first passing through a flow control valve and then through a measuring orifice before entering the intake manifold. Pressure difference across the orifice is used, along with correction factors based on the pressure difference and pressure downstream of the orifice, to measure and control exhaust gas flow.

16 Claims, 3 Drawing Sheets

FLOW MEASUREMENT AND CONTROL

FIELD OF THE INVENTION

The present invention relates to a system and method to measure and control gas flow using pressure measurements upstream and downstream of an orifice, and in particular to measurement of exhaust gas recirculation flow with a flow control valve upstream of the orifice.

BACKGROUND OF THE INVENTION

Engine control systems require accurate control of exhaust gas recirculation (EGR) for controlling regulated emissions and achieving fuel economy improvements. One type of exhaust gas recirculation system externally recirculates the exhaust gas from the exhaust manifold to the intake manifold with a flow control valve placed in the flow path between the exhaust manifold and the intake manifold. Typically, the valve is pneumatically operated and controlled by an electronic engine controller.

One approach to controlling exhaust gas recirculation flow is to use a feedback variable to assure that the actual exhaust gas recirculation flow converges to the desired exhaust gas recirculation flow. One method is to use a differential pressure measured across an orifice in the exhaust flow path upstream of the flow control valve. Then, the differential pressure can be used to infer the actual exhaust gas recirculation flow. The differential pressure measurement provides adequate correlation to exhaust flow because the exhaust pressure varies only slightly in the region where EGR is utilized. Further temperature effects can be accounted for because the upstream exhaust manifold temperature can be correlated to engine operating conditions or ignored due to relatively small variations. Finally, an error between the actual and desired exhaust gas recirculation flow is used to create a control signal that is sent to the flow control valve. Thus, the system can compensate for the effects of engine and component aging, as well as other errors in the system. Such a system is disclosed in U.S. Pat. No. 5,190,017.

The inventors herein have recognized a disadvantage with the above system when the orifice is placed downstream of the valve. In this configuration, flow from the exhaust travels first through a flow control valve and then through the orifice before entering the intake manifold. In this case, the pressure upstream of the orifice (downstream of the valve) varies widely and the assumptions made regarding differential pressure and flow are no longer valid. Also, the temperature upstream of the orifice (downstream of the valve) is no longer correlated directly to engine operating conditions due to the flow expansion in the valve. Thus, there is a significant measurement error when using a differential pressure measurement with a downstream orifice.

One approach to more accurately measure flow is to measure absolute pressure upstream of the orifice, pressure differential across the orifice, and temperature upstream of the orifice. In this way, a correlation between the pressures and temperature can be used to measure the exhaust flow where the pressure and temperatures are widely varying. Alternatively, this approach can be used with the flow control valve where pressure upstream of the valve, pressure differential across the valve, temperature upstream of the valve, and valve area are used to measure flow. Such a system is disclosed in U.S. Pat. No. 4,406,161.

The inventors have recognized a disadvantage with the above approach. The approach requires that upstream temperature be known. Thus, a sensor is needed which adds additional cost and is unacceptable. Further, exhaust manifold temperature estimates based on engine operating conditions inaccurately represent the temperature downstream of a flow control valve. Further, with application of prior art approaches to the flow control valve, valve position, or area, must be measured, adding additional cost.

SUMMARY OF THE INVENTION

An object of the invention claimed herein is to provide an exhaust gas recirculation measurement system and method for an exhaust gas recirculation system having an upstream flow control valve and a downstream measuring orifice.

The above object is achieved, and problems of prior approaches overcome, by a flow measurement system for measuring exhaust gas flow from an exhaust manifold of an internal combustion engine to an intake manifold of the engine. The system comprises a flow control valve having a variable orifice positioned in an exhaust gas recirculation path between the exhaust manifold and intake manifold of the engine, a fixed orifice area located in said path and downstream of said valve, and a computer for measuring a first pressure downstream of said measuring orifice, measuring a differential pressure across said measuring orifice, and calculating a mass flow based on said first pressure and said differential pressure.

By using a combination of the differential pressure across the orifice and a correction as a function of an absolute pressure downstream of the orifice, wherein the orifice is downstream of a flow control valve, a measurement of flow is obtained that gives acceptable performance and avoids discrepancies of prior approaches. Stated another way, an approximation using pressure differential across the orifice and absolute pressure downstream of the orifice accurately measures flow. Temperature measurement upstream of the orifice (downstream of the flow control valve) is inherently included. This measurement method is justified for the special case of flow through an orifice located downstream of a valve, wherein flow originates from an exhaust manifold of an internal combustion engine an exits to an intake manifold of the engine.

This embodiment, herein referred to as the first embodiment, uses the product of pressure differential across the orifice and a correction factor, where the correction factor is related to the pressure downstream of the orifice.

An advantage of the above aspect of the invention is that more accurate feedback control of EGR is obtained.

Another advantage of the above aspect of the invention is that the more accurate feedback control quality yields better fuel economy and driveability.

Yet another advantage of the above aspect of the invention is that the consistent feedback control quality yields lower emissions.

Still another advantage of the above aspect of the invention is that the pressure measurement downstream of the measuring orifice serves the dual purpose of forming a correction factor for the EGR flow and measuring manifold pressure for other uses.

In another aspect of the invention, a second correction is used to further improve the measurement system by a method for measuring flow from an engine exhaust to and engine intake wherein the flow passes through a flow control valve and then a fixed area measuring orifice. The method comprises measuring a pressure difference across the measuring orifice, measuring a pressure downstream of the measuring orifice representative of manifold pressure, calculating a pressure and temperature correction based on said downstream pressure and said differential pressure, and calculating a flow based on said downstream pressure, said differential pressure, and said correction.

In the configuration where the flow control valve is placed upstream and the measuring orifice is placed downstream, both between in the exhaust manifold and intake manifold, a further approximation using manifold pressure and pressure drop across the measuring orifice can be found to include both pressure and temperature effects due to compressible flow expansion through the valve. This embodiment, herein referred to as the second embodiment, obtains further improved accuracy over the first embodiment previously described herein with no additional sensors. In the second embodiment, there is an additional correction factor used that is a function of both pressure difference across the orifice and pressure downstream of the orifice. Again, temperature measurement upstream of the orifice (downstream of the flow control valve) is unnecessary.

An advantage of the above aspect of the invention is that more accurate feedback control of EGR is obtained.

Another advantage of the above aspect of the invention is that the more accurate feedback control quality yields better fuel economy and driveability.

Yet another advantage of the above aspect of the invention is that the consistent feedback control quality yields lower emissions.

In another aspect of the invention, the above object is achieved, and problems of prior approaches overcome, by an article of manufacture comprising a housing, a flow control valve contained in said housing, said flow control valve having a variable area orifice disposed within a gas flow passage and connected to an inlet portion of said passage, a fixed area orifice disposed within said passage and connected to an outlet portion of said passage, a first differential pressure sensor coupled across said fixed area orifice to measure a differential pressure across said fixed area orifice, and a second pressure sensor coupled to said outlet portion to measure outlet pressure.

An advantage of the above aspect of the invention is that more accurate feedback control of flow is obtained.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF AN EMBODIMENT

Figure 1:
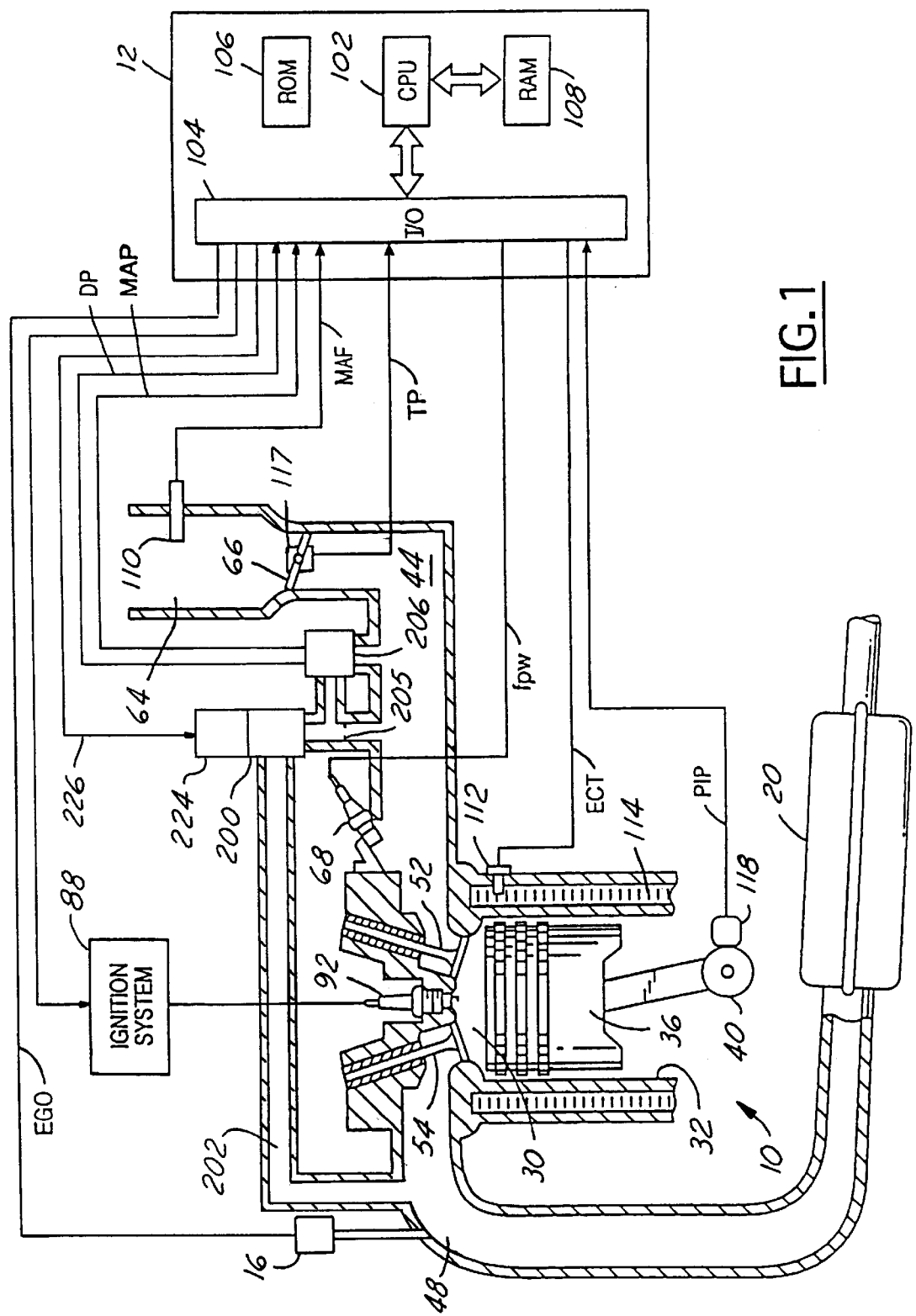
FIG. 1 is a block diagram of an engine in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 116 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N).

Exhaust gas is delivered to intake manifold 44 by a conventional EGR tube 202 communicating with exhaust manifold 48, EGR valve assembly 200, and EGR orifice 205. Alternatively, tube 202 could be a internally routed passage in the engine that communicates between exhaust manifold 48 and intake manifold 44. Flow Sensor 206 communicates with EGR tube 202 between valve assembly 200 and orifice 205. Flow sensor 206 also communicates with intake manifold 44. Stated another way, exhaust gas travels from exhaust manifold 44 first through valve assembly 200, then through EGR orifice 205, to intake manifold 44. EGR valve assembly 200 can then be said to be located upstream of orifice 205.

Flow sensor 206 provides a measurement of manifold pressure (MAP) and pressure drop across orifice 205 (DP) to controller 12. Signals MAP and DP are then used to calculated EGR flow as described later herein with particular reference to FIGS. 3–5. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a preferred embodiment, EGR valve assembly 200 is a vacuum actuated valve. However, as is obvious to those skilled in the art, any type of flow control valve may be used, such as, for example, an electrical solenoid powered valve or a stepper motor powered valve.

Figure 2A:
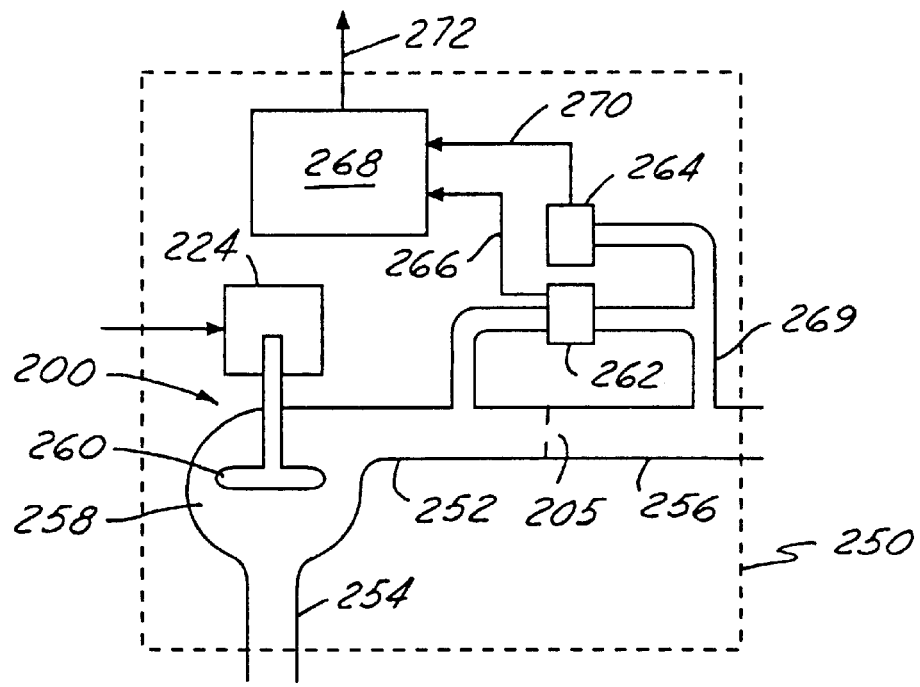
FIGS. 2A and 2B are alternate embodiments of the present invention.
Figure 2B:
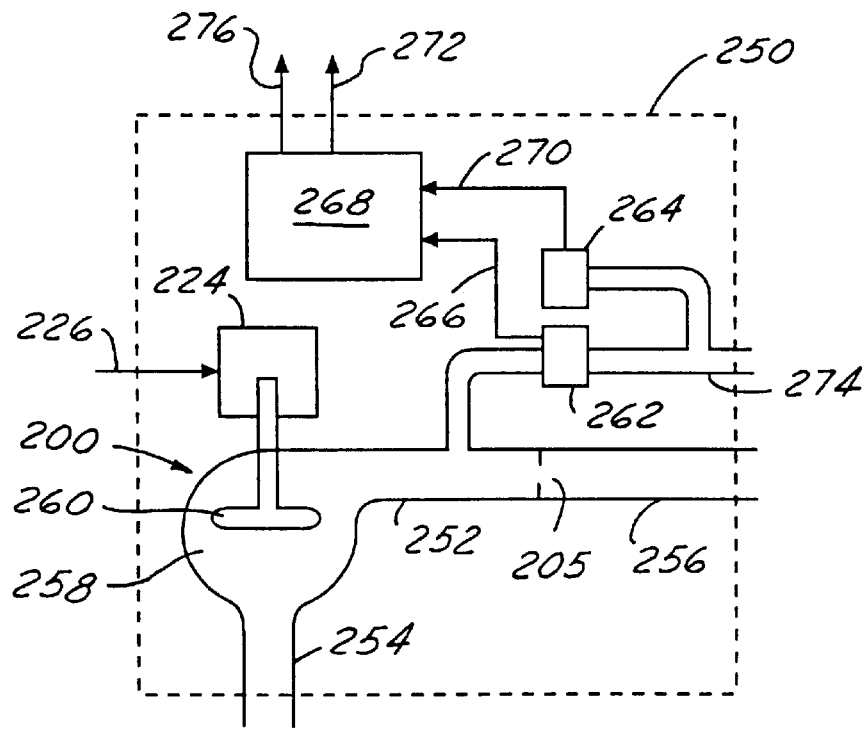

Referring now to FIGS. 2A and 2B, and in particular to FIG. 2A, an alternative embodiment of the present invention is shown in which housing 250 contains path 252 with inlet end 254 and outlet end 256. Variable orifice 258 is controlled by pintle 260 of valve 200. Housing 250 also holds vacuum regulator 224 which is coupled to valve 200 and thereby regulates pintle 260. Path 252 also has orifice 205 coupled to outlet end 256. Differential pressure sensor 262 measures pressure difference across orifice 205 and provides differential pressure signal 266 to circuit 268. Pressure sensor 264 measures communicates via measurement path 269 with outlet end 256 and measure pressure downstream of orifice 205 and provides pressure signal 270 to circuit 268. Circuit 268 calculates, either digitally using microprocessor circuits known to those skilled in the art or using analog circuits known to those skilled in the art, the product of signals 266 and 270. Circuit 268 then makes the result of this calculation available in signal 272.

Alternatively, as shown in FIG. 2B, differential sensor 262 and sensor 264 communicate with downstream flow (not shown) via second communication path 274. In this embodiment, paths 256 and 274 are adapted to be connected to an intake manifold of an internal combustion. Then, path 274 and 256 will be in fluid communication via the intake manifold. Such an arrangement is preferable if circuit 268 also provide signal 276 representing the pressure measured by sensor 264.

Figure 3:
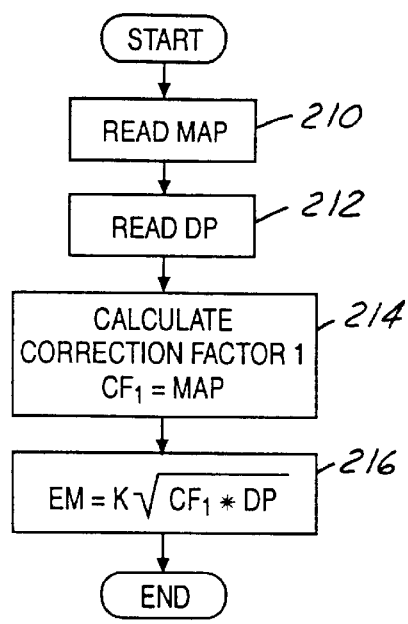
FIGS. 3–5 are a high level flowcharts of various routines for controlling EGR flow.

Referring now to FIG. 3, a routine for calculating EGR flow (EM) is described. In step 210, the signal MAP is read by controller 12 from sensor 206, giving a measure of pressure downstream of orifice 205. Then, in step 212, the differential pressure, DP, across orifice 205 is read by controller 12 from sensor 206. In step 214, a correction factor, CF1, partially accounting for the compressibility effects of the EGR flow is calculated as the absolute pressure measured by signal MAP. Alternatively, if the downstream pressure measured in step 210 was pressure relative to atmosphere, correction factor CF1 would be calculated as the sum of the pressure relative to atmosphere plus the absolute pressure due to the atmosphere. Then, in step 216, EGR flow, EM, is calculated as the square root of the product of correction factor CF1, differential pressure DP, and constant K. Constant K represents a calibration term that accounts for various unit conversions and the area of orifice 205. In this way, pressure and temperature effects due to the expansion of the EGR flow through valve 200 are sufficiently removed and measurement error is reduced.

The routine described in FIG. 3 exploits the nature of the flow due to expansion first through flow control valve 200 and then through orifice 205, where the source of flow is exhaust manifold 48 and the sink is intake manifold 44 of internal combustion engine 10. Due to the typical ranges of exhaust manifold pressure and temperature and intake manifold pressure (MAP), EGR flow may be approximated using the product of pressure difference (DP) across orifice 205 and pressure downstream (MAP) of orifice 205 without need for measuring temperature upstream of orifice 205 (downstream of flow control valve 200).

Figure 4:
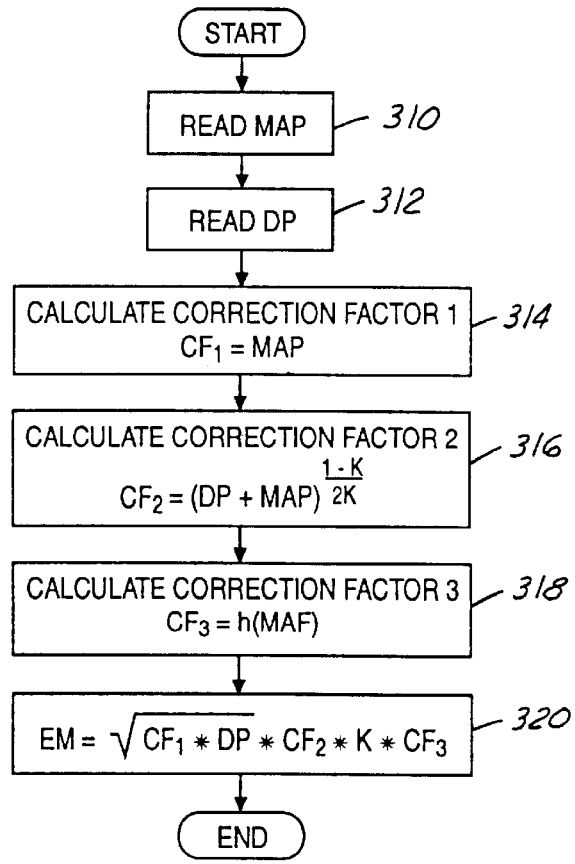

Referring now to FIG. 4, an alternate routine for calculating EGR flow (EM) is described. In step 310, the signal MAP is read by controller 12 from sensor 206, giving a measure of pressure downstream of orifice 205. Then, in step 312, the differential pressure, DP, across orifice 205 is read by controller 12 from sensor 206. In step 314, a correction factor, CF1, partially accounting for the compressibility effects of the EGR flow is calculated as the absolute pressure measured by signal MAP. Alternatively, if the downstream pressure measured in step 310 was pressure relative to atmosphere, correction factor CF1 would be calculated as the sum of the pressure relative to atmosphere plus the absolute pressure due to the atmosphere. Then, in step 316, correction factor CF2 is calculated as a function of both differential pressure DP and downstream pressure MAP, where k represents the ratio of specific heats of exhaust gas. Correction factor CF2 further accounts for the compressibility effects of the EGR flow. Then, in step 318, correction factor CF3 is calculated as a function of flow through the engine, MAF. Correction factor CF3 accounts for variations in exhaust pressure. Function h represents a function relating airflow through the engine (MAP) to exhaust pressure and is determined experimentally. Additionally, function h can include a correction for barometric pressure. In other words, the exhaust pressure is calculated as a function of both MAF and barometric pressure. The effect of barometric pressure on exhaust pressure is also determined experimentally. Barometric pressure can be either measured or estimated using methods known to those skilled in the art. Then, in step 320, EGR flow, EM, is calculated as a function of correction factors CF1, CF2, CF3, differential pressure DP and constant K. In this way, pressure and temperature effects due to the expansion of the EGR flow through valve 200 are further removed and measurement error is further reduced with additional complexity.

Figure 5:
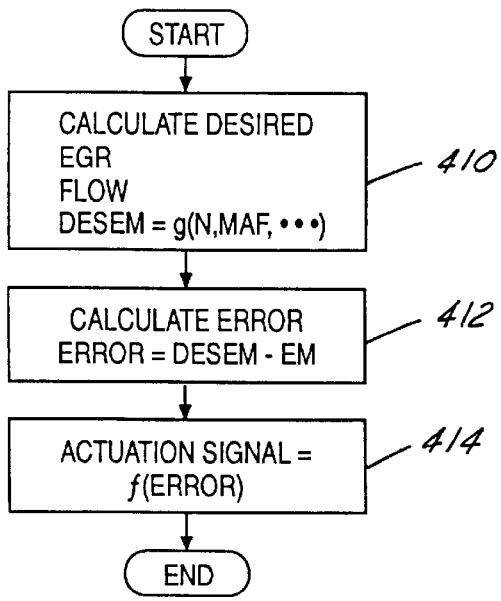

Referring now to FIG. 5, a routine for controlling EGR flow is described. In step 410, the desired EGR flow, DESEM, is calculated as a function of engine operating conditions that include engine speed (determined from signal PIP) and airflow (MAF). Then, the value of EM calculated according to either FIG. 3 or 4 is subtracted from DESEM to create an error signal, ERROR. Then, in step 414, actuation signal 226 is calculated as a function (f) of signal ERROR. In a preferred embodiment, function (f) represents a PID controller. Alternatively, function (f) may represent any type of feedback or feedforward controller known to those skilled in the art.

This concludes the description of the Preferred Embodiment. The reading of it by those skilled in the art would bring to mind many alterations and modifications without departing from the spirit and scope of the invention. Accordingly, it is intended that the scope of the invention be limited by the following claims.

We claim:

1. An article of manufacture comprising:
   a housing;
   a flow control valve contained in said housing, said flow control valve having a variable area orifice disposed within a gas flow passage and connected to an inlet portion of said passage;
   a fixed area orifice disposed within said passage and connected to an outlet portion of said passage;
   a first differential pressure sensor coupled across said fixed area orifice to measure a differential pressure across said fixed area orifice;
   a second pressure sensor coupled to said outlet portion to measure outlet pressure; and
   a circuit for producing a signal representative of a square root of a product of said differential pressure and said outlet pressure based on said first sensor and said second sensor.

2. A method for measuring flow from an engine exhaust to and engine intake wherein the flow passes through a flow control valve and then a fixed area measuring orifice, the method comprising;
   measuring a pressure difference across the measuring orifice,
   measuring a pressure downstream of the measuring orifice representative of manifold pressure, calculating a pressure and temperature correction based on said downstream pressure and said differential pressure; and calculating a flow based on said downstream pressure, said differential pressure, and said correction.

3. The method recited in claim 2 further comprising the step of modifying said calculated flow based on engine airflow.

4. The method recited in claim 2 further comprising the step of modifying said calculated flow based on barometric pressure.

5. The method recited in claim 2 further comprising the step of controlling the flow control valve based on said calculated flow.

6. The method recited in claim 2 wherein said step of calculating said pressure and temperature correction further comprises the step of calculating said pressure and temperature correction based on a function of a sum of said downstream pressure and said differential pressure.

7. The method recited in claim 6 wherein said function is a power function, with said power related to a property of exhaust gas.

8. A flow measurement system for measuring exhaust gas flow from an exhaust manifold of an internal combustion engine to an intake manifold of the engines the system comprising:

a flow control valve having a variable orifice positioned in an exhaust gas recirculation path between the exhaust manifold and intake manifold of the engine;

a fixed orifice area located in said path and downstream of said valve; and a computer for measuring a first pressure downstream of said fixed orifice area, measuring a differential pressure across said fixed orifice area, and calculating a mass flow based on a product of said first pressure and said differential pressure.

9. The system recited in claim 8 wherein said computer further calculates said flow based on a square root of said product of said first pressure and said differential pressure.

10. The system recited in claim 8 wherein said computer further calculates said flow based on the product of said first pressure and said differential pressure multiplied by a function of a sum of said first pressure and said differential pressure.

11. The system recited in claim 8 wherein said function is a power function, with said power related to a property of exhaust gas.

12. The system recited in claim 8 wherein said computer further controls said flow control valve based on said calculated mass flow.

13. The system recited in claim 12 wherein said computer further calculates a desired recirculation flow based on engine operating conditions and controls said flow control valve based on said desired recirculation flow and said calculated mass flow.

14. The system recited in claim 13 wherein said computer further calculates said flow based on a product of said first pressure and said differential pressure multiplied by a function of a sum of said first pressure and said differential pressure.

15. The system recited in claim 14 wherein said function is a power function, with said power related to a property of exhaust gas.

16. The system recited in claim 14 wherein said computer further calculates said flow based on a square root of said product of said first pressure and said differential pressure multiplied by said function of said sum of said first pressure and said differential pressure.

* * * * *